UNITED STATES PATENT OFFICE

LUDWIG J. CHRISTMANN, OF JERSEY CITY, NEW JERSEY, ASSIGNOR TO AMERICAN CYANAMID COMPANY, OF NEW YORK, N. Y., A CORPORATION OF MAINE

PROTECTIVE COMPOUND

No Drawing.    Application filed September 18, 1929. Serial No. 393,592.

This invention relates to methods of cleaning or pickling metals by subjecting the same to an acid bath.

In the metal industries, particularly in the manufacture of iron or steel sheets or the like, which are to be coated with protective metals such as tin, zinc or cadmium, it is a common expedient to first clean the metal surface in order that the subsequent coating material may adhere firmly thereto, without danger of peeling off of the coating. This cleaning treatment usually consists in providing a dilute solution of a non-oxidizing mineral acid material, such as sulphuric acid, called a "pickling" bath, and immersing the metal articles to be cleaned in the bath for a length of time sufficient to remove scale, oxide and other matter from the surface of the metal. The bath is usually maintained at a predetermined temperature, usually above room temperature, during the pickling operation.

The acid in the pickling bath not only acts to remove the undesirable surface materials but also tends to attack the metal itself and, to protect the metal from attack by the acid, there is usually added to the pickling bath a small amount of a substance called an "inhibitor." The inhibitor permits the acid to remove the undesirable surface material from the metal and prevents, either in whole or in part, the action of the acid upon the metal itself. Ordinarily, in the absence of an inhibitor, the acid in attacking the metal gives off a substantial quantity of hydrogen or other gaseous substances with the production of an acid mist or spray which is injurious to the workmen and, in addition, results in appreciable loss of acid.

The present invention is intended to provide an inhibitor which may be prepared easily, which is low in cost and which is highly effective in a pickling bath even though present in small amounts.

I have discovered that a condensation product of aldehyde ammonia and a thiourea compound is highly effective as an inhibitor in a pickling bath. This material may be obtained in any suitable and well known manner. For instance, the condensation product of aldehyde ammonia and mono-phenyl thiourea is prepared as follows:

Aldehyde ammonia is first prepared by passing dry ammonia into a 50-50 mixture of acetaldehyde and ether, the mixture being cooled in a bath of salt and ice. The precipitated acetaldehyde ammonia is filtered and washed with a little alcohol, then with ether and is finally air dried. 40 parts by weight of the acetaldehyde ammonia is mixed with 20 parts of mono-phenyl thiourea in 100 parts of water, and the mixture is warmed on the steam bath for a few minutes. At first a clear solution is obtained but a precipitate gradually begins to form and then a thick paste of white crystals is obtained with the evolution of ammonia during the reaction. The reaction mass may be filtered on cooling and washed with a small amount of water, the product, after drying, having a melting point of 148–149° C.

The inhibitor constituting the subject matter of my invention was tested in a pickling bath in the following manner:

A pickling solution was prepared consisting of 250 cc. of dilute sulphuric acid containing 6% by weight of 66° Bé. acid. The solution was placed in a suitable vessel, maintained at a temperature of 183–185° F. and 0.100 grams of one of my inhibitors was added to the solution. This is equivalent to about 4 one-hundredths of one percent of inhibitor in the bath.

Strips 3½" long and ¾" wide of 30 gauge tin plate stock were used for the tests. The specimens were first cleaned with ether to remove any oil or grease on the surface, and, after drying were immersed in the pickling bath for five minutes to remove the oxide scale. The specimens were removed from the bath, dried and weighed. The specimens were immediately returned to the pickling bath, immersed for twenty minutes, washed, dried and weighed again. The loss in weight was determined and the specimens were subjected to another twenty minute test. Throughout the tests, check runs were made with similar pickling baths but without using any inhibitor. The table given below shows the results obtained with and without my inhibitors in the pickling bath:

| | Initial weight of strip | Imm. 20 min. loss | Imm. 20 min. more total loss | Per cent loss in 20 min. | Per cent loss in 40 min. |
|---|---|---|---|---|---|
| | Grams | Grams | Grams | | |
| No inhibitor in bath | 4.183 | | | | 100.0 |
| Aldehyde ammonia-monophenyl thiourea condensation product in bath | 4.240 | 0.022 | 0.055 | 0.52 | 1.3 |
| Aldehyde ammonia-thiourea condensation product in bath | 4.118 | 0.093 | 0.265 | 2.8 | 6.4 |

From the above it is clear that these products are good inhibitors and effectively curtail the action of the acid upon the metal. This is particularly true in view of the fact that the sample pickled in the bath containing no inhibitor was so rapidly dissolved in the acid that before the end of forty minutes it was completely in solution. Therefore, no effort was made to weigh the check samples during the tests. In similar tests carried out at higher and lower temperatures, it was found that these inhibitors were equally effective as at temperatures originally described.

Although I have described my invention in same detail, it is not limited to the specific matters set forth. The amounts of inhibitor used in pickling baths may, of course, be varied widely and the nature of the bath may also be changed to suit any particular conditions which may prevail. In general, it is not necessary to use more than 1% of inhibitor in the bath and for most purposes less than 0.1% is sufficient. Where I have used the term thiourea compound, it is to be understood that it includes not only thiourea, but its various derivatives such as monophenyl thiourea, and other mono substituted aryl, and alkyl thioureas such as ethyl thiourea, butyl thiourea, benzyl thiourea, etc.

Many other changes may be made in the invention without departing from the spirit and scope thereof except as defined in the appended claims.

I claim:

1. A method of cleaning metals which comprises subjecting the same to a pickling bath containing a small amount of a condensation product of aldehyde-ammonia and monophenyl thiourea.

2. A bath for pickling metals comprising a non-oxidizing mineral acid and a small amount of a condensation product of aldehyde-ammonia and mono-phenyl thiourea.

In testimony whereof, I have hereunto subscribed my name this 16th day of September, 1929.

LUDWIG J. CHRISTMANN.